July 27, 1937.   J. DICHTER   2,087,947
MANUFACTURE OF GLASS VESSELS FROM TUBING
Filed Nov. 7, 1933
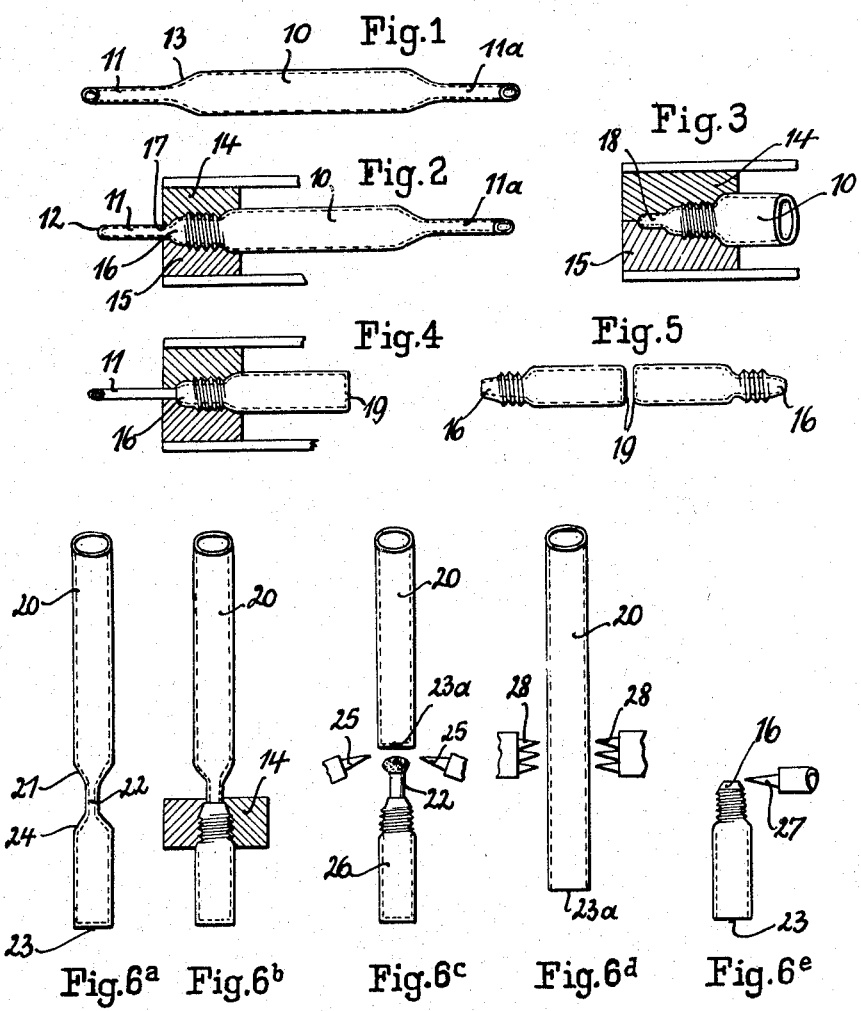
Inventor:

Patented July 27, 1937

2,087,947

UNITED STATES PATENT OFFICE 2,087,947

MANUFACTURE OF GLASS VESSELS FROM TUBING

Jakob Dichter, Berlin-Schoneberg, Germany

Application November 7, 1933, Serial No. 696,951
In Germany November 22, 1932

6 Claims. (Cl. 49—84)

This invention relates to the manufacture of glass vessels from tubing, and it has particular reference to those methods in which the glass tubing is softened by heating and is shaped in a mould by the application of internal air pressure.

It is the object of the present invention to provide an improved method for the production of glass vessels from tubing, particularly those vessels of the kind in which the neck portion is screw-threaded and is provided with a constricted mouth opening for the purpose of spraying or dropping the contents when the bottle or vessel is inverted and gently shaken.

In a process for moulding glass vessels from tubing, said vessels having threaded necks and constricted mouth openings, according to the invention the vessel is formed by first making a narrow and longitudinally extending portion in the tube, then inserting the approximately conical part so produced into a mould for forming the screw-thread and adjacent part of the vessel top. The narrow portion may conveniently form an extension of the constricted mouth opening prior to a finishing operation in which the extension is removed and the constricted mouth opening is smoothed off, while said extension may be utilized for the introduction of air under pressure to effect the moulding operation. Further, pairs of vessels may be moulded from lengths of glass tube which are formed at each end with a tapering region and a longitudinally extending portion of reduced diameter, or alternatively, the vessels may be produced from a continuous length of tube, the neck of one vessel terminating at one end of the constricted portion of the tube, while the other end of said constricted portion is severed automatically as the bottom of the succeeding vessel is produced. The constricted portion may be disposed, if desired, internally within the confines of the mould, the requisite air for moulding being admitted from that end of the tube corresponding to the bottom of the vessel, or the mould may be formed at that end corresponding to the constricted mouth opening of the vessel with an axial passage for the accommodation of the constricted portion of the tube, and passed into position when the mould is in its closed condition. The invention also includes glass vessels produced in accordance with any of the above variations in the process.

In order that invention may be fully understood it is illustrated diagrammatically by way of example in the drawing forming part of the specification in which Figure 1 shows a cut length of tube formed with a constricted portion at each end;

Figure 2 shows one method of forming one end of the tube in a collapsible mould;

Figures 3 and 4 show modified arrangements corresponding to Figure 2;

Figure 5 shows a pair of finished bottles; and

Figures 6a to 6e show various steps in the method of manufacture arranged to produce vessels from continuous lengths of tubing.

In carrying the process shown in Figures 1 to 5, which process is more particularly suitable for hand working, a length 10 of glass tube is taken and is formed by any known means with end constricted portions 11 and 11a. In the method of procedure shown in Figure 2, the end 12 of the constricted portion 11 is closed and the approximately conical portion 13 having previously been softened by heating is inserted into a split mould 14 and is expanded by internal air pressure admitted through the opposite constricted portion 11a. For forming the other end of the tube, the latter is reversed and the process repeated, air being admitted from the portion 11a or the seal at 12 being broken so that a procedure identical with that previously described may be adopted. In the form of mould shown in Figure 2, the end 15 of the mould 14 corresponding to the constricted mouth opening 16 of the vessel is formed with an axial passage 17 to receive the constricted portion 11, or, alternatively, the arrangement shown in Figure 3 may be utilized in which the constricted portion is somewhat shortened as indicated at 18, in which case the end 15 of the mould can be completely closed.

The neck having been formed on both ends of the tube 10 the latter is divided intermediately, as indicated at 19, by a bottoming process of the known type for producing a pair of vessels as indicated in Figure 5, in which the constricted portions 11, 11a or 18 have been removed and the constricted mouth portions 16 smoothed by any suitable method.

If desired, however, the bottoms 19 may be formed in the first place in which the air under pressure would be admitted through the constricted portion 11 as shown in Figure 4, said constricted portion being subsequently removed to form the mouth opening 16.

The process according to the invention is equally applicable for machine working, and a suitable series of steps is indicated in Figure 6a to Figure 6e. A length of tubing 20 is first heated at 21, the lower and/or the upper portions being drawn apart to form a constricted portion 22. A bottom 23 is then formed upon the tube and the part 24, after being softened, is inserted into the mould 14 and is shaped as previously described by the application of air under pressure through the tube 20. As the next step, gas jets 25 cause the severance of the constricted portion 22 from the tube 20, and at the same time form the new bottom 23a for the succeeding vessel. The vessel so formed and indicated at 26 is then removed, the constricted portion 22 is cut off and the mouth opening 16 is smoothed by means of a jet 27 as shown in Figure 6e, while the tube 20 is lowered and a new constricted portion is produced as before after heating is effected by means of burners 28.

It will be readily apparent that the invention provides a useful and serviceable process for the production of glass vessels having screw-threaded necks formed with constricted mouth portions. The severance of the constricted portions 11 may be facilitated and improved by the provision in the mould 14 of an inwardly extending ridge (not shown) for producing a groove immediately adjacent the mouth opening, so that when the moulding operation is finished the constricted portion 11 cracks off of its own accord or may be readily removed in a clean manner.

What I claim is:—

1. A process for moulding from glass tubing, glass vessels having threaded necks and constricted mouth openings, consisting in forming upon said tubing a narrow longitudinal portion having an internal cross sectional area equal to the cross sectional area desired in the mouth opening, said narrow longitudinal portion being joined to the tubing by an approximately conical portion, heating said conical portion and inserting it into a mould for forming the screw thread and adjacent part of the vessel top under the influence of internally applied air pressure.

2. A process for moulding from glass tubing, vessels having threaded necks and constricted mouth openings, consisting in first forming an axial portion of reduced diameter, heating the tube at the junction between the portions of reduced and normal diameter, placing a mould around this portion and causing moulding to take place by producing an internal air pressure greater than atmospheric, the vessel top being finally formed by removing the narrow portion of the tube and smoothing the constricted opening so produced.

3. A process for moulding in succession from glass tube, a number of vessels having sprinkler necks, consisting in forming a bottom on the tube, heating a portion of the tube where the neck is to be formed, extending the tube axially to produce a tapering portion and a narrow longitudinal portion and moulding the tapering portion under air pressure in a mould so as to form a screw threaded neck and constricted mouth opening.

4. The method of forming a pair of vessels from a cut length of glass tubing, the glass tubing having a cross sectional area equal to the cross sectional area desired in the finished vessels, which consists in constricting the ends of said length of tubing to reduce the internal cross sectional area thereof to the area desired in the mouth openings of the vessels, forming conical portions between the constricted portions of the length of tubing and the nonconstricted portion thereof, heating said conical portions, successively enclosing said conical portions in a mold adapted to form a screw thread and the adjacent part of the vessel top, admitting fluid under pressure to the interior of the length of tubing to blow the conical portions thereof into engagement with the mold, severing the constricted portions from the adjacent portions to form mouth openings in the ends of the length of tubing, and dividing said length of tubing into half sections by suitable bottoming operations.

5. The method of producing a vessel having a constricted mouth opening which consists in heating a portion of a length of tubing the cross sectional area of which is substantially equal to the cross sectional area desired in the body of the finished vessel, constricting the heated portion of the tubing to reduce the cross sectional area thereof to that desired in the mouth opening of the vessel, heating a portion of the constricted part of the length of tubing, enclosing the heated portion of the tubing in a mold adapted to shape the vessel top, and supplying a fluid under pressure to the interior of the length of tubing to blow the heated portion thereof into engagement with the mold.

6. The method of producing a vessel having a constricted mouth opening which consists in constricting a portion of a glass tube to form a portion of reduced cross sectional area and a tapering portion joining the portion of reduced cross sectional area to the portion of original cross sectional area, heating the tapered portion of the tube, enclosing the tapered portion of the tube in a mold adapted to shape the vessel top, supplying a fluid under pressure to the interior of the glass tube to blow the heated portion thereof into engagement with the mold, and severing the portion of the tube of reduced cross sectional area from the vessel top thus formed.

JAKOB DICHTER.